United States Patent [19]

Nakajima et al.

[11] Patent Number: 4,629,891
[45] Date of Patent: Dec. 16, 1986

[54] RADIATION IMAGE READ-OUT METHOD AND APPARATUS

[75] Inventors: Nobuyoshi Nakajima; Yuuma Adachi; Toshitaka Agano, all of Kanagawa, Japan

[73] Assignee: Fuji Photo Film Co., Ltd., Kanagawa, Japan

[21] Appl. No.: 774,688

[22] Filed: Sep. 11, 1985

[30] Foreign Application Priority Data

Sep. 13, 1984 [JP] Japan ................................. 59-192098

[51] Int. Cl.[4] .............................................. G03C 5/16
[52] U.S. Cl. ................................ 250/327.2; 250/484.1
[58] Field of Search ........... 250/484.1, 327.2, 214 AG

[56] References Cited

U.S. PATENT DOCUMENTS 4,410,799 10/1983 Okamoto ......................... 250/354.1

Primary Examiner—Carolyn E. Fields
Attorney, Agent, or Firm—Sughrue, Mion, Zinn, Macpeak and Seas

[57] ABSTRACT

In a radiation image read-out method and apparatus wherein preliminary read-out is conducted prior to final read-out for adjusting final read-out conditions and/or image processing conditions for a radiation image stored in a stimulable phosphor sheet, the light detection range of a light detector for detecting light emitted by the stimulable phosphor sheet upon exposure to stimulating rays in the preliminary read-out is changed in accordance with radiation image recording conditions, so that the emitted light is detected over the whole light emission intensity range fixed by the image recording conditions.

6 Claims, 3 Drawing Figures

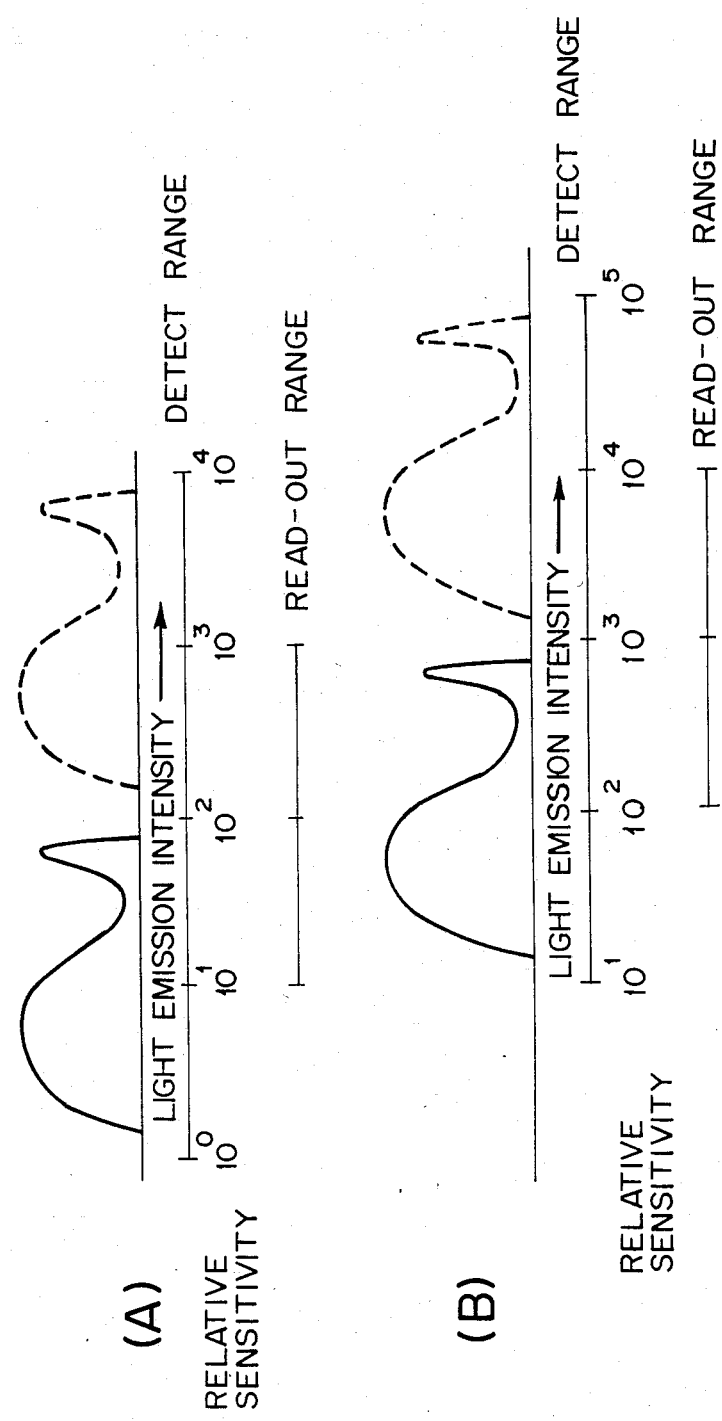

RADIATION IMAGE READ-OUT METHOD AND APPARATUS

BACKGROUND OF THE INVENTION

1. Field of the Invention

This invention relates to a method of reading out a radiation image stored in a stimulable phosphor sheet by exposing the stimulable phosphor sheet to stimulating rays which cause it to emit light in proportion to the stored radiation energy, and photoelectrically detecting the emitted light. This invention particularly relates to a radiation image read-out method wherein preliminary read-out is conducted for approximately ascertaining the image input information prior to final read-out for reproducing a visible image. This invention also relates to an apparatus for carrying out the method.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. More specifically, since the amount of light emitted upon stimulation after the radiation energy is stored in the stimulable phosphor varies over a very wide range in proportion to the amount of energy stored therein, it is possible to obtain an image having desirable density regardless of the amount of exposure of the stimulable phosphor to the radiation, by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image system using a stimulable phosphor sheet, compensation for deviation of the level of the radiation energy stored in the stimulable phosphor sheet from a desired level can easily be carried out by adjusting the read-out gain to an appropriate value when photoelectrically reading out the light emitted by the stimulable phosphor sheet upon stimulation thereof. Therefore, the quality of the reproduced radiation image is not adversely affected by a fluctuation in radiation dose due to fluctuating tube voltage or MAS value of the radiation source, a variation in the sensitivity of the stimulable phosphor sheet or the photodetector, a change in radiation dose according to the condition of the object, or a fluctuation in the radiation transmittance according to the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted from the stimulable phosphor sheet into an electric signal, and processing the electric signal as desired.

However, in order to eliminate various influences caused by the fluctuation of radiographic exposure conditions and/or to obtain a radiation image having a high image quality or a high diagnostic efficiency and accuracy, it is necessary to investigate such image input conditions of the radiation image stored in the stimulable phosphor sheet as, for example, the level of radiation dose used for image recording, or the image input pattern which is determined by the portion of the body (e.g. the chest or the abdomen) or the radiographic method used, such as plain image or contrasted image radiographing, before reproducing the radiation image to a visible image, and then to adjust the read-out gain appropriately or to process the electric signal appropriately based on the detected image input conditions or the image input pattern. The image input conditions and the image input pattern will hereinafter be simply referred to as the image input information when they are referred to generically. It is also necessary to determine the scale factor to optimize the resolution according to the contrast of the image input pattern.

Investigation of the image input information may be conducted prior to the visible image reproduction by use of the method as disclosed in Japanese Unexamined Patent Publication No. 58(1983)-67240. In the disclosed method, a read-out operation for detecting the image input information of a radiation image stored in a stimulable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out gain and/or the scale factor is adjusted to an appropriate value, and/or an appropriate signal processing is conducted, on the basis of the image input information obtained by the preliminary readout.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like positioned on the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

In the aforesaid method, since the image input conditions and the image input pattern of a radiation image stored in the stimulable phosphor sheet can be investigated in advance, it is possible to obtain a radiation image having an improved image quality, particularly a high diagnostic efficiency and accuracy by adjusting the read-out gain and the scale factor and by processing the detected electric signal in the manner most suitable for the image input pattern on the basis of the detected image input information without using a read-out system having a wide dynamic range.

When the aforesaid preliminary read-out is conducted, since light of every intensity range emitted by the stimulable phosphor sheet must be detected accurately, it is necessary to use a means exhibiting a wide light detection range as the light detection means, for example, a photomultiplier, of the preliminary read-out system. In general, when a radiation image of an object such as the human body is read out, it is sufficient for the read-out range of the light detection means in final read-out to be on the order of $10^2$ in terms of relative sensitivity, and the light detection range of the light detection means for preliminary read-out to be on the order of $10^4$ in terms of relative sensitivity. Actually, a photomultiplier or the like having such a light detection range is used as the light detection means for preliminary read-out.

However, the intensity range of light emitted by a stimulable phosphor sheet changes markedly in accordance with radiation image recording conditions, for example, the image recording portion of the object and the image recording method such as normal image recording or enlarged image recording. For example, in mammography or the like, the level of light emitted by the stimulable phosphor sheet becomes markedly higher than in a radiation image of a general object portion. In order to accurately detect all types of radiation images recorded under different image recording conditions, the read-out range in final read-out must be on the order of $10^3$ in terms of relative sensitivity. Light detection means having such a read-out range are available commercially. When such a wide read-out range is set, it is necessary to use a light detection means for preliminary read-out having a light detection range on the order of $10^5$ in terms of relative sensitivity in order to adjust the final read-out conditions to appropriate values by preliminary read-out. However, it is not always possible to obtain the aforesaid order of light detection range because of the performance limits of a logarithmic amplifier or the like used in association with the light detection means.

SUMMARY OF THE INVENTION

The primary object of the present invention is to provide a radiation image read-out method wherein preliminary read-out is conducted efficiently by accurately detecting the light emission of over the whole light emission intensity range for all stimulable phosphor sheets carrying radiation images recorded under different image recording conditions.

Another object of the present invention is to provide an apparatus for carrying out the method.

The present invention provides a radiation image read-out method in which preliminary read-out is conducted for adjusting final read-out conditions and/or image processing conditions, wherein the improvement comprises changing the light detection range of a light detection means in preliminary read-out in accordance with radiation image recording conditions, so that the light detection means covers the whole light emission intensity range fixed by the image recording conditions.

The radiation image read-out method in accordance with the present invention is carried out by an apparatus including:

(i) a final read-out system comprising a means for emitting stimulating rays to a stimulable phosphor sheet carrying a radiation image stored therein, a means for moving said stimulable phosphor sheet, and a light detection means for photoelectrically detecting light which is emitted by said stimulable phosphor sheet upon exposure to stimulating rays and carries the radiation image, and (ii) a preliminary read-out system comprising a means for emitting stimulating rays, a means for moving said stimulable phosphor sheet, and a light detection means for photoelectrically detecting the light which is emitted by said stimulable phosphor sheet upon exposure to stimulating rays and carries the radiation image, the stimulation energy of stimulating rays in the preliminary read-out being lower than the stimulation energy of stimulating rays in the final read-out, wherein the improvement comprises the provision of a light detection level changing means for changing the light emission detecting level of said light detection means of said preliminary read-out system in accordance with radiation image recording conditions.

In the present invention, since the light emitted by the stimulable phosphor sheet in the preliminary read-out is detected accurately over the whole light intensity range for all stimulable phosphor sheets carrying radiation images recorded thereon under different image recording conditions, it is possible to adjust the final read-out conditions to appropriate values and to obtain a reproduced visible image having an improved image quality, particularly a high diagnostic efficiency and accuracy.

BRIEF DESCRIPTION OF THE DRAWINGS

FIG. 2 is an explanatory view showing the histogram of the intensity of light emitted by the stimulable phosphor sheet, the light detection range in the preliminary read-out, and the light detection range in the final read-out.

DESCRIPTION OF THE PREFERRED EMBODIMENTS

Figure 1:
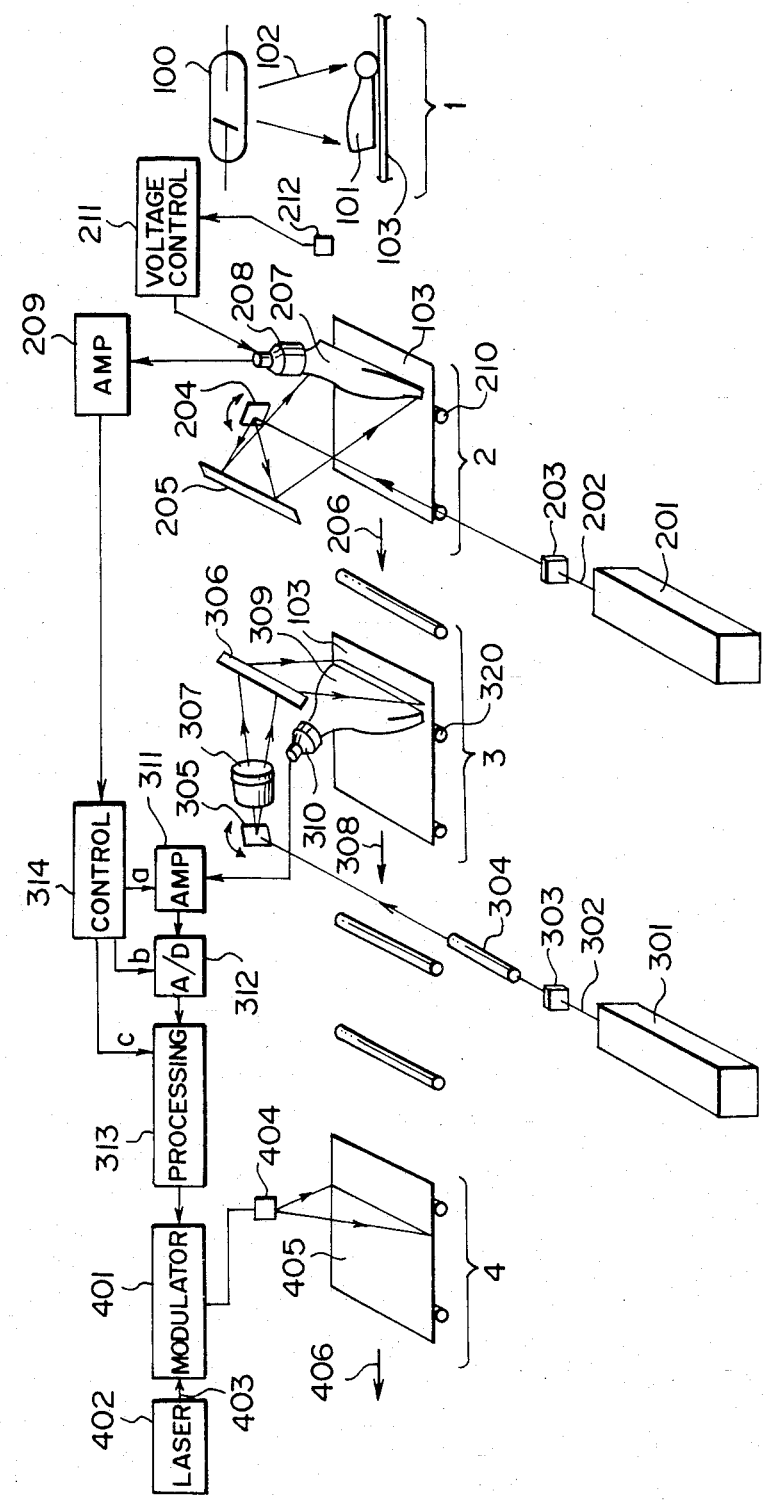
FIG. 1 is a schematic view showing the radiation image recording and reproducing system wherein an embodiment of the radiation image read-out apparatus in accordance with the present invention is employed.

The present invention will hereinbelow be described in further detail with reference to the accompanying drawings.

FIG. 1 shows a radiation image recording and reproducing system provided with an embodiment of the radiation image read-out apparatus in accordance with the present invention. Basically, the radiation image recording and reproducing system comprises a recording section 1, a preliminary read-out section 2 and a final read-out section 3 in which the method of the present invention is employed, and an image reproducing section 4. X-rays 102 emitted by an X-ray source 100 at the recording section 1 to an object 101 pass through the object 101 and impinge upon a stimulable phosphor sheet 103.

The stimulable phosphor sheet 103 carrying a radiation image of the object 101 recorded thereon is sent to the preliminary read-out section 2. Examples of the stimulable phosphor used in the stimulable phosphor sheet 103 are described in detail, for example, in U.S. Pat. No. 4,236,078 and European Patent Publication No. 21,342.

In the preliminary read-out section 2, a laser beam 202 emitted by a laser beam source 201 is first passed through a filter 203 for cutting off light having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emitted thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. the sub-scanning direction) by a sheet conveying means 210 constituted by conveyor rollers or the like and, thus, the whole surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 103 are selected so that the stimulation energy of the laser beam 202 for preliminary read-out is smaller than the stimulation energy of the laser beam for final read-out.

The "stimulation energy" referred to in this invention means the effective energy of the stimulating rays which the stimulable phosphor sheet receives per unit area.

As the ratio of the stimulation energy of the stimulating rays in the preliminary read-out to the stimulation energy of the stimulating rays in the final read-out increases, the amount of radiation energy remaining in the stimulable phosphor sheet after the preliminary read-out decreases. It has been found that, when the aforesaid ratio is smaller than one, it is possible to obtain a radiation image suitable for viewing, particularly for diagnostic purposes, by adjusting the final read-out gain to an appropriate value. However, in order to obtain a radiation image having an improved image quality, particularly a high diagnostic efficiency and accuracy, the aforesaid ratio should preferably be as small as possible insofar as the image input information of the radiation image stored in the stimulable phosphor sheet can be detected sufficiently to permit adjustment of the read-out conditions or the image processing conditions, that is, insofar as the light emitted by the stimulable phosphor sheet in the preliminary read-out can be detected sufficiently for the above-mentioned purposes. Thus, the aforesaid stimulation energy ratio should generally be 50% or less, preferably 10% or less, more preferably 3% or less. The lower limit of this ratio is determined according to the accuracy of the system for detecting the light emitted by the stimulable phosphor sheet in the preliminary read-out.

When exposed to the laser beam 202 as described above, the stimulable phosphor sheet 103 emits light in proportion to the X-ray energy stored therein, and the emitted light enters a light guide member 207 which may be of a shape and a material as disclosed in U.S. Pat. No. 4,346,295. The light is guided inside of the light guide member 207 through total reflection, emanates from a light output face of the light guide member 207 and is received by a photomultiplier 208 acting as the light detection means. The light receiving face of the photomultiplier 208 is closely contacted with a filter for transmitting only light having the wavelength distribution of the light emitted by the stimulable phosphor sheet 103 and cutting off the light having the wavelength distribution of the stimulating rays, so that the photomultiplier 208 can detect only the light emitted by the stimulable phosphor sheet 103 upon stimulation thereof. The high voltage of the photomultiplier 208 is changeable by a high voltage control circuit 211 acting as the light detection level changing means as described later. The light detected by the photomultiplier 208 is converted into an electric signal carrying the image input information. The electric signal is amplified by an amplifier 209, and the signal generated thereby is sent to a control circuit 314 at the final read-out section 3. On the basis of the image input information thus obtained, the control circuit 314 calculates an amplification degree setting value (a), a scale factor setting value (b) and an image processing condition setting value (c).

After the preliminary read-out is finished, the stimulable phosphor sheet 103 is sent to the final read-out section 3. At this section, a laser beam 302 emitted by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is positioned an $f\theta$ lens 307 for maintaining the beam diameter of the laser beam 302 uniform during the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. sub-scanning direction) by a sheet conveying means 320 constituted by conveyor rollers or the like and, consequently, the whole area of the stimulable phosphor sheet 103 is exposed to and scanned by the laser beam 302. Upon exposure to the laser beam 302, the stimulable phosphor sheet 103 emits light in proportion to the X-ray energy stored therein, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emanates from the light output face of the light guide member 309 and is received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The light emitted by the stimulable phosphor sheet 103 and detected by the photodetector 310 in the final read-out is converted into an electric signal, amplified to an appropriate level by an amplifier 311 the sensitivity of which has been adjusted by the amplification degree setting value (a), and then sent to an A/D converter 312. In the A/D converter 312, the electric signal is converted into a digital signal by use of a scale factor which has been set by the scale factor setting value (b) to suit the width of signal fluctuation. The digital signal thus obtained is sent to a signal processing circuit 313, in which it is processed on the basis of the image processing condition setting value (c) so as to obtain a radiation image suitable for viewing, particularly for diagnostic purposes. The electric image signal obtained by the signal processing circuit 313 is sent to a light modulator 401 at the image reproducing section 4. As for the signal processing, it is possible to employ a frequency processing as disclosed in U.S. Pat. Nos. 4,315,318, 4,346,295 or 4,387,428, or European Patent Publication No. 31,952, and a gradation processing as disclosed in U.S. Pat. Nos. 4,302,672, 4,276,473 or 4,310,886.

In the image reproducing section 4, a laser beam 403 emitted by a reproducing laser beam source 402 is modulated by the light modulator 401 on the basis of the electric image signal received from the signal processing circuit 313, and is made to impinge upon a photosensitive material 405 such as a photographic film by a scanning mirror 404 for scanning the photosensitive material 405 by the laser beam 403. At this time, the photosensitive material 405 is moved normal to the scanning direction, i.e. in the direction as indicated by the arrow 406. Accordingly, the radiation image is recorded on the photosensitive material 405. For reproducing the radiation image, it is also possible to use any other appropriate method. For example, the final signal obtained at the final read-out section 3 may be electronically displayed on a display device such as a CRT, or the final radiation image may be recorded by use of a video tape recorder or a printer. Alternatively, the radiation image may be reproduced on a thermosensitive recording material by use of heat waves.

Changing of the light detection level of the photomultiplier 208 will be described in detail below.

In the radiation image recording and reproducing system of FIG. 1, various radiation images such as mammograms and pelvis images are recorded and reproduced. FIG. 2 shows the histogram of the intensity of light emitted by the stimulable phosphor sheet 103. As indicated by the histogram (A) in FIG. 2, in the case of general radiation images, the light emitted by the stimulable phosphor sheet 103 is detected accurately when the read-out range in the final read-out is on the order of $10^2$ in terms of relative sensitivity. However, the light emission intensity range is different in accordance with the radiation image as indicated by the solid line and the broken line. Therefore, in the preliminary read-out, a light detection range on the order of $10^4$ is necessary. Actually, as the photomultiplier 208 for the preliminary read-out, a photomultiplier having such a level of light detection range is used.

However, in the mammography, the light emission range as a whole shifts to the higher intensity side relative to the other radiation images as indicated by the histogram (B) in FIG. 2. Therefore, in order to accurately detect the light emitted by the stimulable phosphor sheet 103 in the preliminary read-out for all types of radiation images including mammograms and other object portion images, a light detection range on the order of $10^5$ in terms of relative sensitivity is necessary. However, at present, it is not generally possible to obtain such a wide light detection range.

Accordingly, the preliminary read-out section 2 is provided with an image recording condition detector 212 which detects the stimulable phosphor sheets 103 carrying a mammogram and sends a mammography detection signal to the high voltage control circuit 211. In this embodiment, the image recording condition detector 212 detects that the sheet 103 carries a mammogram by detecting a bar code on the stimulable phosphor sheet 103. Upon receiving the mammography detection signal, the high voltage control circuit 211 changes the high voltage of the photomultiplier 208 for the preliminary read-out to shift the light detection range of the photomultiplier 208 towards the high sensitivity side by one order of ten in terms of relative sensitivity as indicated by the histogram (B) in FIG. 2. In this manner, even in the case of mammography, it is possible to accurately detect the light emitted by the stimulable phosphor sheet 103 in the preliminary read-out over the whole light emission intensity range, and to adjust the final read-out conditions, i.e. the read-out conditions and/or image processing conditions, to appropriate values. In the final read-out for the mammography, the read-out range of the photodetector 310 for the final read-out is shifted to the high sensitivity side as indicated by the histogram (B) in FIG. 2 on the basis of the image signal obtained by the preliminary read-out.

In order to detect that the stimulable phosphor sheet 103 sent to the preliminary read-out carries a mammogram, it is also possible to record a mark indicating the image recording portion on the stimulable phosphor sheet 103 and to detect the mark. Or, the mark may be visually detected by the operator of the system and the high voltage of the photomultiplier 208 for the preliminary read-out may be changed manually.

The intensity range of the light emitted by the stimulable phosphor sheet also changes in accordance with the image recording method such as normal image recording or enlarged image recording, besides the image recording portion. For example, in the case of enlargement mammography, the light emission intensity range is similar to that in the read-out of radiation images of other portions, i.e. as indicated by the histogram (A) in FIG. 2. In the present invention, when the light emission intensity range changes in accordance with the image recording method, the light detection range of the light detection means in the preliminary read-out is changed as suitable for the image recording method. Namely, the present invention is applicable to all cases where the light emission intensity range changes in accordance with the radiation image recording conditions such as the image recording portion and the image recording method. The manner in which the light emission intensity range should be changed with respect to the radiation image recording conditions depends on the X-ray image recording apparatus and can be measured experimentally. Therefore, the light detection range in the preliminary read-out may be changed with reference to the measured manner of change.

As described, for example, in Japanese Unexamined Patent Publication No. 58(1983)-67242, a single read-out system may be used for the preliminary read-out and the final read-out. In this case, after the preliminary read-out is finished, the stimulable phosphor sheet is returned to the read-out system by a sheet conveying means and the final read-out is conducted. In the preliminary read-out step, the energy of the stimulating rays is adjusted to be lower than the energy of stimulating rays used in the final read-out. The present invention is also applicable to such a case.

We claim:

1. A radiation image read-out method in which, prior to final read-out for exposing a stimulable phosphor sheet carrying a radiation image of an object stored therein to stimulating rays which cause the stimulable phosphor sheet to emit light in proportion to the stored radiation energy, photoelectrically detecting the emitted light to obtain an electric image signal for reproducing a visible image, preliminary read-out for approximately detecting the radiation image stored in the stimulable phosphor sheet is conducted by use of stimulating rays of a level lower than the level of stimulating rays used in the final read-out, read-out conditions in the final read-out and/or image processing conditions are adjusted on the basis of the information obtained by the preliminary read-out, and the final read-out is conducted by use of the adjusted conditions, wherein the improvement comprises changing the light detection range of a light detection means in the preliminary read-out in accordance with image recording conditions for said radiation image.

2. A method as defined in claim 1 wherein said image recording conditions are discriminated by use of an image recording condition detector positioned at the preliminary read-out section.

3. A method as defined in claim 1 wherein said light detection range of the light detection means is changed by changing the voltage of the light detection means.

4. A radiation image read-out apparatus including:
    (i) a final read-out system comprising a means for emitting stimulating rays to a stimulable phosphor sheet carrying a radiation image stored therein, a means for moving said stimulable phosphor sheet, and a light detection means for photoelectrically detecting light which is emitted by said stimulable phosphor sheet upon exposure to stimulating rays and carries the radiation image, and
    (ii) a preliminary read-out system comprising a means for emitting stimulating rays, a means for moving said stimulable phosphor sheet, and a light detection means for photoelectrically detecting the light which is emitted by said stimulable phosphor sheet upon exposure to stimulating rays and carries the radiation image, the stimulation energy of stimulating rays in the preliminary read-out being lower than the stimulation energy of stimulating rays, in the final read-out, wherein the improvement comprises the provision of a light detection level changing means for changing the light emission detecting level of said light detection means of said preliminary read-out system in accordance with radiation image recording conditions.

5. An apparatus as defined in claim 4 further comprising a means for detecting said image recording conditions, said means being positioned at said preliminary read-out system.

6. An apparatus as defined in claim 4 wherein said light detection level changing means changes said light emission detecting level by changing the voltage of said light detection means.

* * * * *